United States Patent
Lindén et al.

(10) Patent No.: US 9,541,129 B2
(45) Date of Patent: Jan. 10, 2017

(54) ROLLING BEARING GUIDE RING

(71) Applicant: AKTIEBOLAGET SKF, Gothenburg (SE)

(72) Inventors: Hans Lindén, Ytterby (SE); Nils Manne, Göteberg (SE); Peter James, Mölndal (SE)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 14/433,087

(22) PCT Filed: Sep. 20, 2013

(86) PCT No.: PCT/SE2013/000146
§ 371 (c)(1),
(2) Date: Apr. 2, 2015

(87) PCT Pub. No.: WO2014/054996
PCT Pub. Date: Apr. 10, 2014

(65) Prior Publication Data
US 2015/0252847 A1    Sep. 10, 2015

(30) Foreign Application Priority Data
Oct. 4, 2012 (SE) .................................... 1200599

(51) Int. Cl.
*F16C 33/37* (2006.01)
*F16C 19/28* (2006.01)
(Continued)

(52) U.S. Cl.
CPC ............... *F16C 33/46* (2013.01); *F16C 19/28* (2013.01); *F16C 23/086* (2013.01); *F16C 33/37* (2013.01);
(Continued)

(58) Field of Classification Search
CPC ....... F16C 33/37; F16C 33/372; F16C 33/374; F16C 33/46; F16C 33/58; F16C 33/543; F16C 19/28; F16C 19/38; F16C 33/38; F16C 33/48; F16C 33/605; F16C 23/086
See application file for complete search history.

(56) References Cited

U.S. PATENT DOCUMENTS 837,830 A  *  12/1906  Heinkel et al. .......... F16C 19/26 384/551
1,404,430 A  *  1/1922  Brush .................... F16C 19/183 384/513
(Continued)

FOREIGN PATENT DOCUMENTS

DE         7319978 U      8/1973
DE    102006042675 A1 *  3/2008  .............. F16C 19/38
(Continued)

OTHER PUBLICATIONS

Machine Translation of JP 2001-82467 dated Mar. 27, 2001.*

*Primary Examiner* — Alan B Waits
(74) *Attorney, Agent, or Firm* — Bryan Peckjian; SKF USA Inc. Patent Dept.

(57) ABSTRACT

An annular guide ring for controlling the position of at least one of rolling elements and a bearing cage in relation to an inner ring of a rolling bearing. The guide ring comprises a base portion, a first side portion extending in a radial direction from a first axial end portion of the base portion, and a second side portion extending in a radial direction from a second axial end portion of the base portion, wherein the first side portion and the second side portion are integrally formed with the base portion of a one-piece sheet material. Also described is a method for manufacturing the guide ring for the rolling bearing.

13 Claims, 5 Drawing Sheets

(51) Int. Cl.
*F16C 33/46* (2006.01)
*F16C 23/08* (2006.01)
*F16C 33/58* (2006.01)
*F16C 33/48* (2006.01)
*F16C 19/38* (2006.01)
*F16C 33/374* (2006.01)
*F16C 33/60* (2006.01)

(52) U.S. Cl.
CPC ............... *F16C 33/48* (2013.01); *F16C 33/58* (2013.01); *F16C 19/38* (2013.01); *F16C 33/374* (2013.01); *F16C 33/605* (2013.01); *Y10T 29/49689* (2015.01)

(56) References Cited

U.S. PATENT DOCUMENTS

| | | | |
|---|---|---|---|
| 2,387,962 A | 10/1945 | Williams | |
| 6,152,606 A * | 11/2000 | Shirosaki | F16C 23/086 384/475 |
| 6,579,012 B2 * | 6/2003 | Brandenstein | B23P 15/003 29/451 |
| 8,702,315 B2 * | 4/2014 | Fugel | F16C 33/46 29/898.067 |
| 2012/0134614 A1 * | 5/2012 | Keller | F16C 23/086 384/490 |

FOREIGN PATENT DOCUMENTS

| | | |
|---|---|---|
| DE | 102009052350 A1 | 12/2011 |
| DE | 102010045319 A1 | 3/2012 |
| FR | 2489905 A3 | 3/1982 |
| JP | S6154519 U | 4/1986 |
| JP | 2001082467 A * | 3/2001 |
| JP | 201201777 A | 1/2012 |
| WO | 2011015184 A1 | 2/2011 |

* cited by examiner

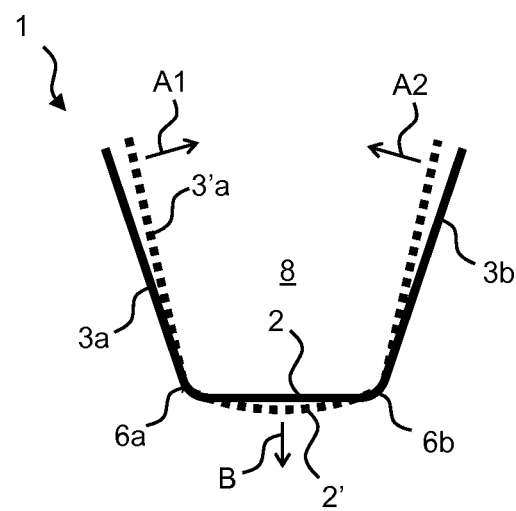
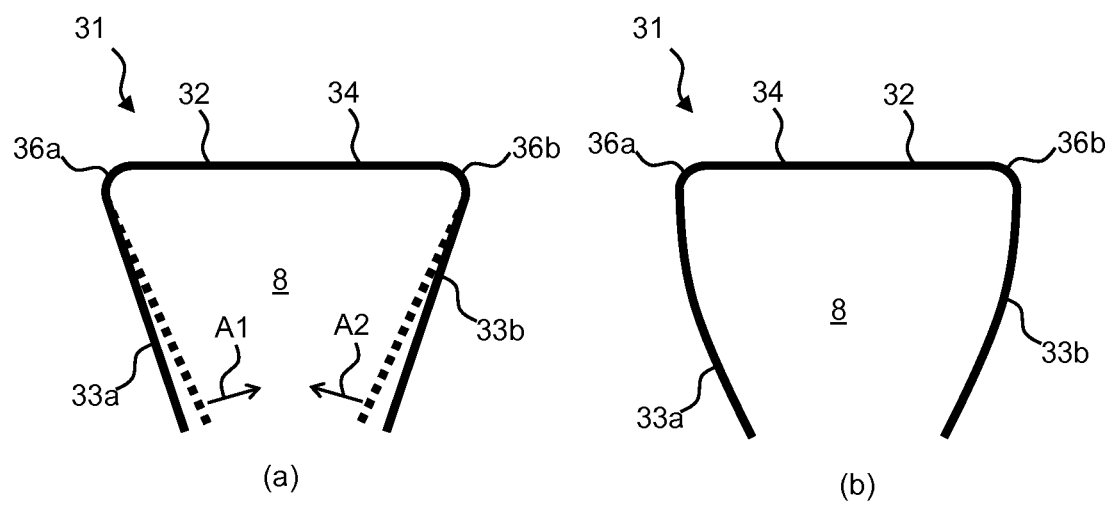

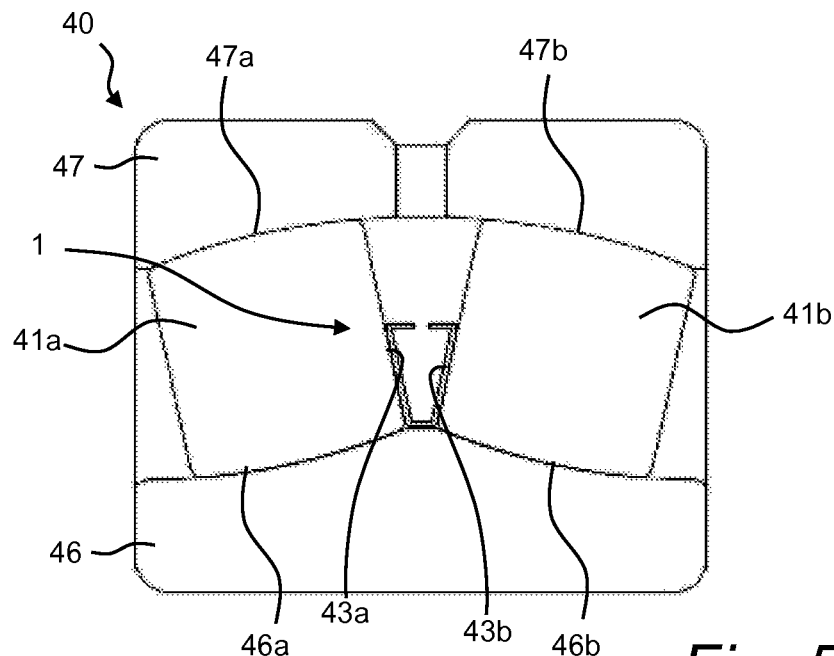
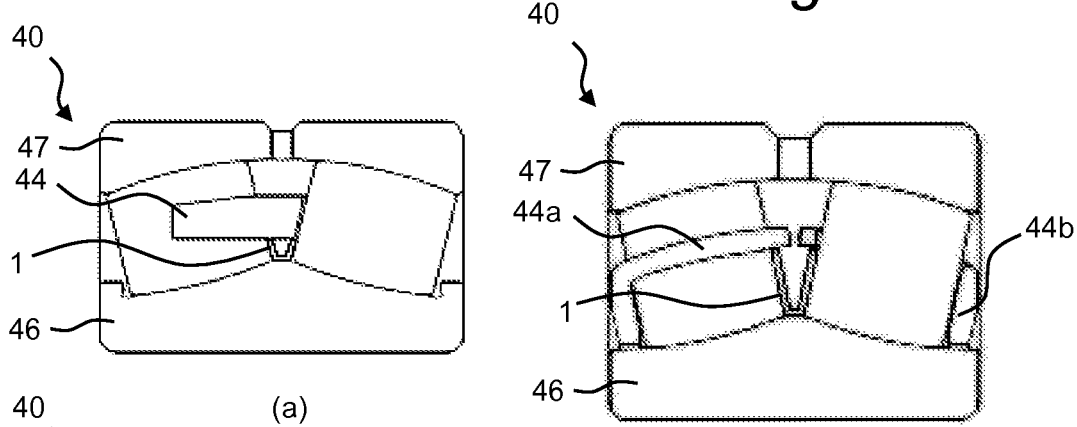
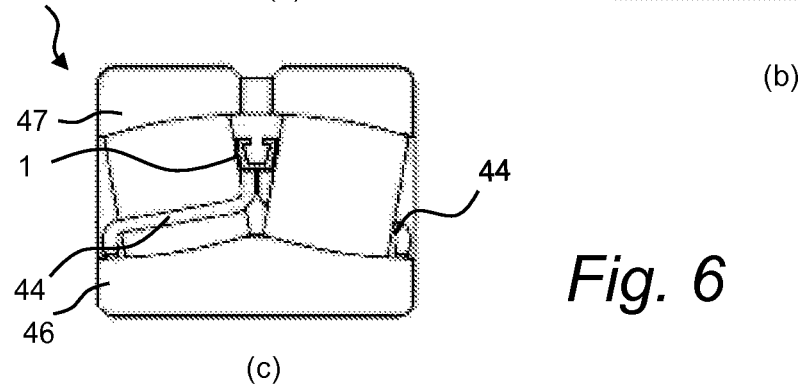
Fig. 5
Fig. 6

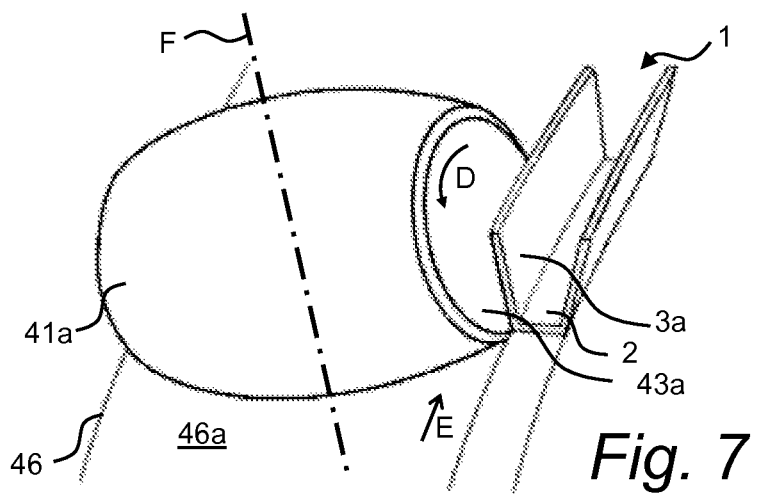

ROLLING BEARING GUIDE RING

CROSS REFERENCE TO RELATED APPLICATIONS

This is a National Stage Application claiming the benefit of International Application Number PCT/SE2013/000146 filed on 20 Sep. 2013, which claims the benefit of Sweden (SE) Patent Application Serial Number 1200599-7, filed on 4 Oct. 2012, both of which are incorporated herein by reference in their entireties.

FIELD OF THE INVENTION

The present invention relates to rolling bearings and rolling bearing components, and more specifically to a guide ring for a rolling bearing. The present invention also relates to a method for manufacturing a guide ring for a rolling bearing.

The guide ring may for example by used for controlling the position of the rolling elements in a rolling bearing, such as a roller bearing, or equivalent, wherein the orientation of rolling elements may be controlled in relation to each other and in relation to the raceways of the rolling bearing. The guide ring may also be used for controlling the position of a rolling bearing cage in relation to an inner ring, outer ring and/or rolling elements of a rolling bearing arrangement.

BACKGROUND ART

In order to provide suitable operation characteristics of rolling bearings comprising rolling elements arranged between raceways of an inner and outer ring, it is known to provide guide rings. Typically, the guide ring is arranged in between the inner and outer ring of the bearing, in contact with the rolling elements, such as rollers, in order to guide the rolling elements such that they travel along an intended path in a desired manner in relation to the raceways on the inner and outer ring during operation. For example, the guide ring restricts the movement of the rolling elements in a desirable manner, such as to prevent undesired skewing motion of rollers. The guide ring may also be arranged to support bearing cages arranged to control the position of the rolling elements in relation to each other during operation in a rolling element bearing. For example, the bearing cage may rest on a guide ring arranged radially inside the bearing cage.

Depending on the size of the rolling bearing, the guide ring is manufactured using conventional turning and boring techniques involving a cutting tool removing material from a solid metal workpiece by cutting action, or by sintering techniques which results in more porous solid guide rings.

However, for a rolling bearing, or bearing assembly, comprising a guide ring, the added weight from the guide ring increases the overall weight and moment of inertia of the rotating components. The guide ring also impedes the performance of the bearing and increase the cost for handling and manufacturing. Hence, there is a need for providing improved rolling element bearing cages allowing for improved performance and more efficient manufacturing

SUMMARY OF THE INVENTION

In view of the above-mentioned and other drawbacks of the prior art, a general object of the present invention is to provide an improved and more efficient guide ring for rolling element bearings.

These and other objects are achieved by a guide ring and a method for manufacturing a guide ring according to the independent claims. Preferred embodiments of the invention are presented in the dependent claims.

According to a first aspect thereof, the present invention relates to a guide ring for controlling the position of rolling elements and/or a bearing cage in relation to an inner ring of a rolling bearing, which guide ring has an annular shape with a centered axial opening along a center axis, and comprises a base portion extending in an axial direction, a first side portion extending in a radial direction from a first axial end portion of the base portion, and a second side portion extending in a radial direction from a second axial end portion of the base portion, wherein the first side portion and the second side portion are integrally formed with the base portion of a one-piece sheet material.

The present invention is based on the realization that an improved and more efficient guide ring for rolling bearings is provided by forming the guide ring of a sheet material which is bent or formed into the desired shape. Thereby, the thickness and weight of the guide ring, or a complete bearing arrangement comprising the guide ring, may be reduced, which, in turn, reduces its moments of inertia leading to improved and more efficient rolling bearings. A further advantage is that the guide ring may be manufactured in an efficient and improved manner from a workpiece formed of thinner and lighter sheet material. In particular, aspects such as handling and manufacturing are considerably improved and may be performed in a more cost efficient manner. For example, the guide ring may advantageously be manufactured by providing a hollow profile of metal steel comprising the base portion and first and second side portions, and bending the profile into a ring and joining the tangential edge portions to each other, e.g. by welding, to provide a durable joint. For example, the guide ring may also be formed in manufacturing process involving pressure turning, or metal spinning, or flow forming of sheet metal workpiece, such as a thin sheet metal, using e.g. a CNC machine and one or more tool turrets equipped with metal forming tools. The guide ring may also be efficiently manufactured using roll forming techniques, such as in a continuous bending manufacturing in which a sheet-formed workpiece is passed through a roller, or sets of rollers mounted on consecutive stands, performing bending operation. Hence, the body of the guide ring may advantageously be manufactured from workpiece to product in a manufacturing process line using manufacturing techniques with low scrapes rates and low tool costs, while allowing for high production rates, high precision, and low material costs.

The guide ring may for example be mounted and used in a rolling bearing for preventing skewing of the rolling elements, such as rollers. In other words, during movement of the rollers during operation, the rollers are restricted, or prevented, by the guide ring from turning about an axis normal to the roller-raceway interface. Skewing may be generated as a part of the kinematic effects of roller bearings and may negatively influence the bearing life. The guide ring may for example also be used in a rolling bearing for supporting and radially positioning a bearing cage in relation to the inner ring of the rolling bearing and/or the rolling elements.

According to an exemplifying embodiment of the guide ring, the first side portion comprises an axially outer first control surface for controlling the position rolling elements, and the second side portion comprises an axially outer second control surface for controlling the position of the rolling elements. Advantageously the control surfaces allow for improved motion control and restriction of skewing of rolling elements arranged axially adjacent, or in sliding contact, with the respective control surface. For example, each control surface extends annularly around the center axis, is rotationally symmetric around the center axis and is tilted by having a normal direction inclined in a radially inward direction. Each control surface may further be substantially straight. According to an exemplifying embodiment, the first and/or second control surfaces may also be curved axially inward or outward in relation an axial center of the guide ring. For example, the curvature of the control surface may be adapted to the shape of the rolling elements, in particular the guide-ring-contacting surface of the rolling elements, such as the guide-ring-contacting surface of an axial end portion of rolling element formed of a roller.

According to an exemplifying embodiment, the guide ring further comprises a radially outer cage support portion for supporting and radially positioning a radially outer bearing cage. The outer cage support portions is advantageous in that it allows for improved controlling of the position of a bearing cage in a rolling bearing during operation, wherein he cage support portion ensures that the cage is radially aligned in a desired position in the rolling bearing. For example, cages can be suspended between the inner and outer ring by the guide ring in an advantageous manner while reducing radial contact and friction between the bearing cage and rolling elements.

According to an exemplifying embodiment, the guide ring has a wedge-shaped cross-section formed by the first and second side portions, which wedge-shaped cross-section extends annularly around the center axis. By being wedge-shaped, improved guiding of tilted rolling elements is provided, such as roller having a rotational axis which is tilted in a direction towards the center axis, away from the guide ring. According to an exemplifying embodiment, the geometry of the wedge-shaped cross-section, as defined by the axially outer surfaces of the first and second side portions, converges in a radially inward direction towards the center axis.

According to an exemplifying embodiment of the guide ring, the base portion, the first side portion, and the second side portion extend annularly around the center axis.

According to an exemplifying embodiment of the guide ring, a hollow space is formed axially between the first and second side portions, which hollow space extends annularly around the center axis. Thereby, a light weight and improved guide ring is realized. According to an exemplifying embodiment, the hollow space is axially delimited by the first and second side portions, and radially limited by the base portion.

According to an exemplifying embodiment, the guide ring is arranged to flex such that the first and second side portions move towards each other in the axial direction. Advantageously, a flexing guide ring allows for improved and more versatile guiding of rolling elements in a rolling bearing, wherein the movement of the rolling elements in relation to the guide ring during operation may cause the side portions of the guide ring to flex axially inward. Thereby, improved motion of the rolling elements inside the bearing may be achieved. For example, flexing of the guide ring allows for different guiding characteristics of the guide ring depending on the position of the rolling element in the rolling bearing, e.g. if the rolling element is in the loaded zone or unloaded zone of the bearing. Also, by providing a flexing guide ring, improved load distribution and uniform running of the rolling elements in relation to the raceways of the bearing may be realized.

According to an exemplifying embodiment, the guide ring further comprises a first bend formed in the sheet material, which first bend forms the first axial end portion of the base portion, and a second bend formed in the sheet material, which second bend forms the second axial end portion of the base portion. Thereby, a compact and efficient guide ring is provided which may be manufactured in an improved manner. The one-piece sheet material workpiece, of which the guide ring is formed, may be bent to form the center base portion, which is bent on axially opposing sides to form the first and second bend, wherein each bend extends to the first and second side portions. Also, the first and second bends may advantageously form resilient portions of the guide ring arranged to allow for flexing of the first and second side portions.

According to a further embodiment thereof, the present invention relates to a rolling bearing comprising the guide ring, which rolling bearing further comprises rolling elements, wherein the first side portion is abutting, i.e. in contact with, an axial end portion of at least one rolling element of a first row of rolling elements on a first axial side of the guide ring, and the second side portion is abutting, i.e. in contact with, an axial end portion of at least one rolling element of a second row of rolling elements arranged on a second axial side of the guide ring. Thereby, a rolling bearing with improved performance and which may be manufactured in a more efficient manner is provided. According to an exemplifying embodiment of the rolling bearing, the first side portion is arranged to restrict skewing motion of the rolling elements of the first row of rolling elements, and the second side portion is arranged to restrict skewing motion of the rolling elements of the second row of rolling elements.

According to a further embodiment thereof, the present invention relates to a rolling bearing comprising the guide ring, which rolling bearing further comprises an inner ring, rolling elements, and a bearing cage for controlling the position of the rolling elements, wherein a radially outer cage support portion of the guide ring is abutting, i.e. in contact with, the bearing cage for supporting and radially positioning the bearing cage in relation to the inner ring.

According to an exemplifying embodiment, the rolling bearing is a double row rolling element bearing, such as a double row spherical roller bearing (SRB), wherein the guide ring is mounted in an axially intermediate position between a first and a second row of rolling elements.

According to an exemplifying embodiment, the rolling elements are rollers, such as symmetric rollers. According to an exemplifying embodiment, the rolling elements are SRB-rollers.

According to an exemplifying embodiment, the sheet material is formed of sheet metal or sheet steel. According to an exemplifying embodiment, the sheet material has a thickness between 0.2 and 5 mm, or between 0.5 and 3 mm.

According to a further aspect thereof, the present invention relates to a method for manufacturing a guide ring for controlling the position of rolling elements and/or a bearing cage in relation to an inner ring of a rolling bearing, which method comprises providing a workpiece of sheet material to be formed into the guide ring, forming the workpiece by bending action such that the workpiece is provided with an annular shape having a center axis, providing a first side portion by forming the workpiece, and providing a second side portion by forming the workpiece, wherein a base portion of the workpiece is formed between the first and second side portions, which base portion extends in an axial direction, the first side portion extends in a radial direction from a first axial end portion of the base portion, and the second side portion extends in a radial direction from a second axial end portion of the base portion. The method allows for manufacturing of an improved guide ring in a more efficient manner. The method is further advantageous in similar manners as described in relation to the first aspect of the invention.

According to an exemplifying embodiment of the method, the step of providing the first and/or second side portion comprises rotating the workpiece and forming the workpiece with a first tool by exerting the first tool on the rotating workpiece according to a predetermined pattern, such as a predetermined pattern defined numerically and which is implementable in a computer numerical control (CNC) machine. For example, the workpiece, such as metal tube workpiece formed of sheet metal, may be worked by a motion controlled tool turret, equipped with a tool, against a form, wherein the tool is used to shape the workpiece against the form while the workpiece and form are rotated in relation to the tool. The workpiece may also be shaped between by two or a plurality of motion controlled tool turrets equipped with respective tools, such as rollers, wherein the workpiece is arranged to rotated between the tools while the tools are controlled to cooperatively move to form the intended profile of the sheet material comprising the base portion, first side portion and second side portion.

According to a further exemplifying embodiment the, the step of providing the first and/or second side portion comprises passing the workpiece against, or through, at least one roller arranged to form the workpiece. Thereby, the base portion, first side portion and/or second side portion may advantageously be provided in the one-piece sheet material workpiece by roll forming techniques. Optionally or alternatively, the workpiece may be passed through consecutive sets of rollers, wherein each set of rollers performs an incremental bending operation of the workpiece according to a predetermined pattern.

According the an embodiment, the guide ring is formed of a workpiece formed of flat metal strip piece, or a metal strip arranged on a continuous roll of metal, which is fed into a roll forming arrangement comprising a roller or a line of consecutive rollers arranged to form the metal strip with the intended profile. For example, a first set of rollers provide an incremental bending step and a final set of rollers provide a final bending step. Also, intermediary set of rollers may be arranged between the first and final set of roller for provided further incremental bending steps prior to the final bending step of the final roller set.

Flow forming and/or roll forming manufacturing of the guide ring may advantageously involve a sheet metal workpiece of high strength steel, or high strength stainless steel, since those manufacturing processes constitute gentle forming processes e.g. involving incremental bending operations.

Generally, other objectives, features, and advantages of the present invention will appear from the following detailed disclosure, from the attached dependent claims as well as from the drawings are equally possible within the scope of the invention.

BRIEF DESCRIPTION OF DRAWINGS

Embodiments of the invention will now be described, by way of example, with reference to the accompanying drawings, wherein:

FIG. 1a is a schematic side view of an exemplifying embodiment of the guide ring according to the present invention.

FIG. 1b is a schematic enlarged cross-sectional view of the guide ring embodiment in FIG. 1a.

FIG. 3 is a schematic cross-sectional view of an exemplifying embodiment of the guide ring according to the present invention.

FIGS. 4a-b are schematic cross-sectional views of exemplifying embodiments of the guide ring according to the present invention.

FIG. 5 a schematic cross-sectional view of a rolling bearing comprising an embodiment of the guide ring according to the present invention.

FIGS. 6a-c are schematic cross-sectional views of rolling bearings comprising different embodiments of the guide ring according to the present invention.

FIG. 7 is a schematic perspective view of an exemplifying embodiment of the guide ring for guiding a roller bearing roller, according to the present invention.

Figure 1:
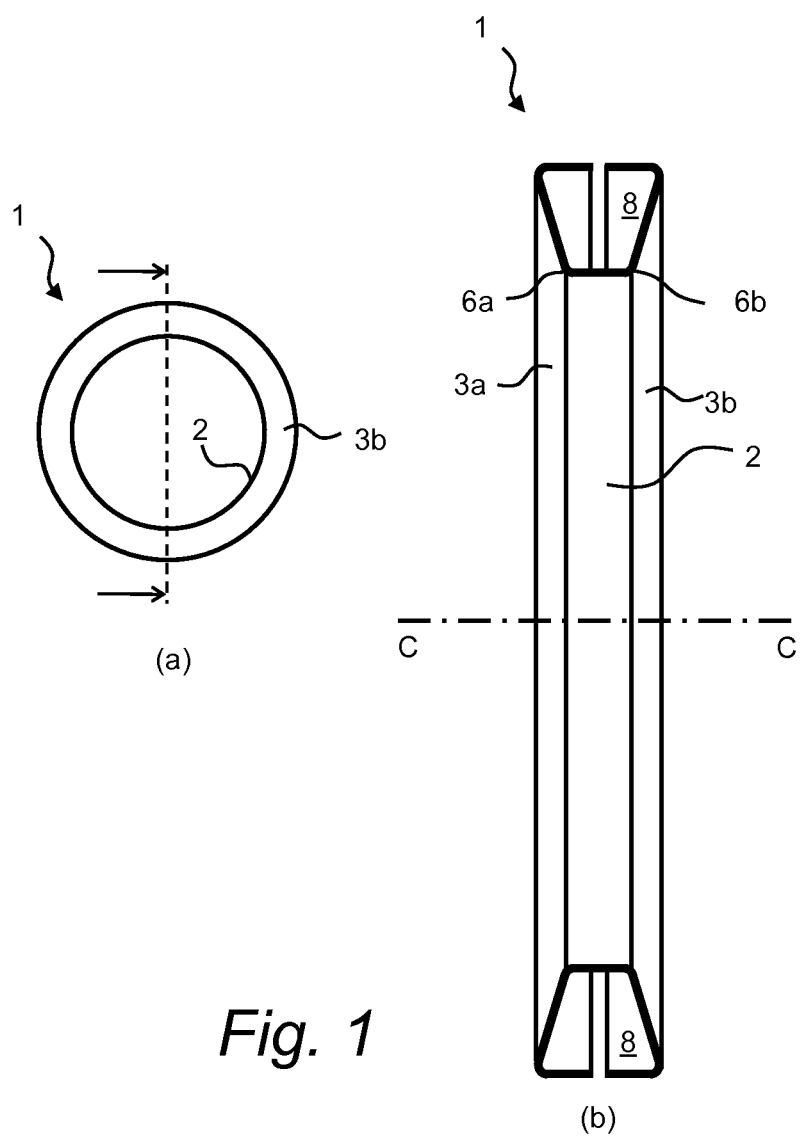

It should be understood that the drawings are not true to scale and, as is readily appreciated by a person skilled in the art, dimensions other than those illustrated in the drawings are equally possible within the scope of the invention.

DETAILED DESCRIPTION OF EMBODIMENTS OF THE INVENTION

In the drawings, similar, or equal elements are referred to by equal reference numerals.

In FIGS. 1a-b, an embodiment of guide ring 1 according to the present invention is shown. In FIG. 1a, the guide ring 1 is shown from the side and in FIG. 1b an enlarged cross-sectional view of the guide ring 1 is shown, as indicated by the dashed line in FIG. 1a.

As illustrated, the guide ring 1 has an annular shape with a centered axial opening along a center axis C. The guide ring 1 further comprises a radially inner base portion 2 which extending annularly around the centered axial opening and which has a cylindrical shape extending axially along the center axis C. The guide ring 1 further comprises a first side portion 3a extending in an outward radial direction from a first axial end portion 6a of the base portion 2, which first axial end portion 6a extends annularly around the centered axial opening in a tilted configuration in relation to the center axis C. The guide ring 1 further comprises a second side portion 3b extending in an outward radial direction from a second axial end portion 6b of the base portion 2, which second axial end portion 6b extends annularly around the centered axial opening in an opposing tilted configuration in relation to the center axis C. Furthermore, the first side portion 3a and the second side portion 3b are integrally formed with the base portion 2 of a one-piece sheet material. In other words, the guide ring is formed by a one-piece sheet material which has been provided with a shape forming the base portion 2 and the first and second side portion 3a and 3b, as illustrated. The first and second side portion 3a and 3b further forms control surface for contacting e.g. side portion of rolling elements formed of rollers, during operation when being arranged in a rolling bearing.

In FIGS. 2a-f, schematic cross-sectional views of exemplifying embodiments of the guide ring 1 according to the present invention are shown. Each one of the guide rings 1 is arranged as described with reference to FIG. 1a-b, if not stated or illustrated differently. Furthermore, each guide ring comprises a hollow space 8 which is defined by and located axially between the first and second side portions 3a and 3b, which hollow space 8 extends annularly around the center axis.

Figure 2:
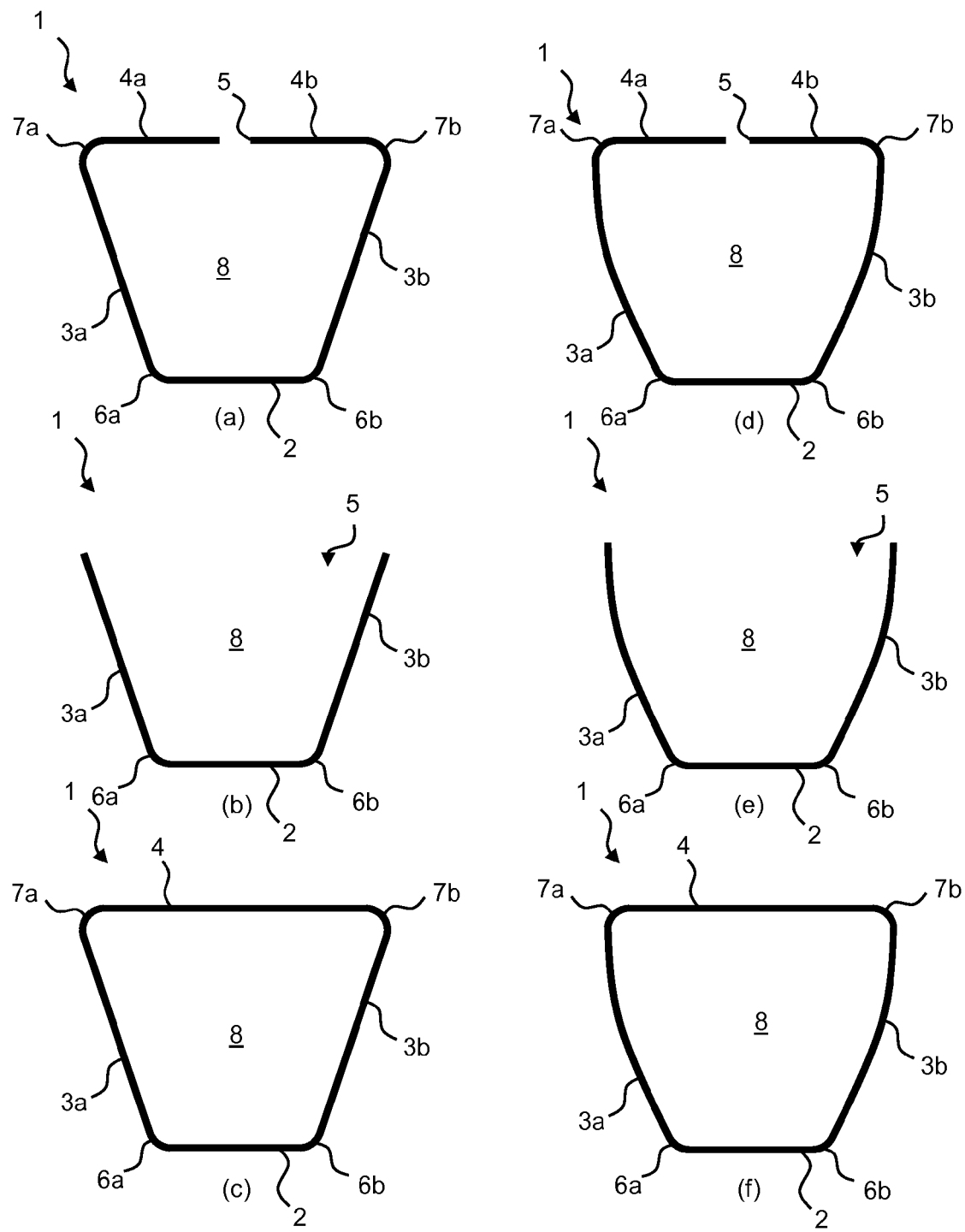
FIGS. 2a-f are schematic cross-sectional views of exemplifying embodiments of the guide ring according to the present invention.

In FIG. 2a, the guide ring 1 comprises substantially straight side portions 3a and 3b, each forming a substantially straight axially outer control surface. The guide ring further comprises radially outer cage support portion formed of cage support portions 4a and 4b being arranged for supporting and radially positioning a radially outer bearing cage. The cage support portions 4a and 4b are formed of the same one-piece sheet material as the base portion 2 and first and second side portion 3a and 3b, and are separated from each other. As illustrated, cage support 4a extends from the first side portion 3a via bend 7a, and cage portion 4b extends from the second side portion 3b via bend 7b. Moreover, cage portions 4a and 4b extend annularly around the guide ring 1, around the center axis, and are separated by a radially outer opening 5. The radial outer opening 5 allows for axial flexing movements of the first side portion 3a and cage portion 4a in relation to second side portion 3b and cage portion 4b. For example, a cage may rest on radially outer support surfaces of the cage portions 4a and 4b facing in a radially outward direction.

In FIG. 2b, the guide ring 1 has a differing radially outer configuration which is open, or fully open, in a radially outward directions, wherein the guide ring 1 ends in the radially outward direction by the radially outer ends of the respective straight side portions 3a and 3b. As illustrated, the outer opening 5 extends between the full axial distance between the radially outer ends of the respective straight side portions 3a and 3b. Furthermore, the radially outer ends of the respective straight side portions 3a and 3b may serve as cage support portions.

In FIG. 2c, the guide ring 1 is provided with a fully enclosing cross-sectional profile which enclose the internal hollow space 8 provided by continuous cage support portion 4 extending between the radially outer bends 7a and 7b, which bends 7a and 7b connect the cage support portion 4 with the first and second side portions 3a and 3b, respectively. The guide ring design illustrated in FIG. 2c allows for a more stable and rigid guide ring with reduced flexing of the first side portion 3a in relation to the second side portion 3b.

In FIG. 2d, the illustrated guide ring 1 is arranged as described in relation to FIG. 2a, unless stated otherwise. In FIG. 2e, the illustrated guide ring 1 is arranged as described in relation to FIG. 2b, unless stated otherwise. In FIG. 2f, the illustrated guide ring 1 is arranged as described in relation to FIG. 2c, unless stated otherwise. As illustrated, the guide rings 1 in FIG. 2d-f differs in that the side portions 3a and 3b are provided with a curved geometry which provides the guide ring with a partly biconvex shape, wherein the radially center portion of the side portions 3a and 3b bulges axially outward. Alternatively, the guide ring may be provided with a partly biconcave shape, wherein the radially center portions of the side portions 3a and 3b bulges axially inwards.

In FIG. 3, a schematic cross-sectional view of an exemplifying embodiment of the guide ring 1 according to the present invention is shown, which guide ring 1 is arranged as described above in relation to FIG. 2b. As illustrated, the guide ring is illustrated in two different states: a resting state indicated by the solid line, and in a flexed state indicated by dotted line. Hence, as indicate, the guide ring 1 is arranged to flex such that the first and second side portions 3a and 3b move towards each other in the axial direction. In more detail, the first side portion 3a may flex in direction A1 into a flexed position 3a', and the second side portion 3b may flex in direction A2 into a flexed position 3b'. For example, the flexing movements of first and second side portions 3a and 3b may be provided by bending movements of the bends formed by the first and second axial end portions 6a and 6b, respectively. The flexing movement may also be provided by bending of the base portion 2 into a bended state 2'.

FIGS. 4a-b, schematic cross-sectional views of exemplifying optional embodiments of the guide ring 31 according to the present invention are shown. The embodiments of the guide ring 31 are arranged as described with reference to the guide ring 1 in FIGS. 1a-b, unless stated or depicted otherwise. In particular, the embodiments of the guide ring 31 differs from the guide ring 1 in FIGS. 1a-b, in that it comprises a base portion 32 which is arranged in a radially outward position. The guide ring 31 further comprises a first side portion 33a extending in an inward radial direction from a first axial end portion 36a of the base portion 32, which first axial end portion 36a extends annularly around the centered axial opening in a tilted configuration in relation to the center axis C. The guide ring 31 further comprises a second side portion 33b extending in an inward radial direction from a second axial end portion 36b of the base portion 32, which second axial end portion 36b extends annularly around the centered axial opening in an opposing tilted configuration in relation to the center axis C. Furthermore, the first side portion 33a and the second side portion 33b are integrally formed with the base portion 32 of a one-piece sheet material. In other words, the guide rings 31 is formed by a one-piece sheet material which has been provided with a shape forming the base portion 32 and the first and second side portion 33a and 33b, as illustrated. The first and second side portions 33a and 33b further form control surfaces for contacting e.g. side portions of rolling elements formed of rollers during operation, when being arranged in a rolling bearing. Furthermore, each guide ring 31 comprises a hollow space 8 which is defined by and located axially between the first and second side portions 33a and 33b, which hollow space 8 extends annularly around the center axis. Furthermore, base portion 32 may form a cage support portion 34 for supporting and radially positioning a radially outer bearing cage. The outer cage support 34 portions is advantageous in that it allows for improved controlling of the position of a bearing cage in a rolling bearing during operation, wherein he cage support portion ensures that the cage is radially aligned in a desired position in the rolling bearing.

As shown in FIG. 4a, the guide ring 31 may be arranged to flex such that the first and second side portions 33a and 33b move towards each other in the axial direction. In more detail, the first side portion 33a may flex in direction A1, and the second side portion 33b may flex in direction A2. Furthermore, the side portion 33a and 33b are substantially straight and tilted inwardly in the inward radial direction in relation to the center axis of the guide ring 31. As shown in FIG. 4b, the side portions 33a and 33b are provided with a curved shaped which allows for a reduced contact area with the rolling elements during operation inside a rolling bearing.

In FIG. 5, a schematic cross-sectional view of a rolling bearing 40 comprising a floating type embodiment of the guide ring 1 according to the present invention is shown. The rolling bearing 40 comprises a first row of rolling elements 41a and a second row of rolling elements 41b. The first side portion of the guide ring 1 is abutting, or in contact with, an axial end portion 43a of the rolling elements 41a of the first row of rolling elements arranged on a first axial side of the guide ring 1, and the second side portion is abutting, or in contact with, an axial end portion 43b of the rolling elements 41*b* of the second row of rolling elements arranged on a second axial side of the guide ring 1. Hence, the guide ring 1 is arranged in an axially intermediate position between the rolling elements, wherein the respective side portions of the guide ring is in contact with the axial end portions to act to control the rolling path and orientation of the rolling elements in the rolling bearing 40.

As shown, the rolling bearing 40 further comprises an inner ring 46 provided with a first inner raceway 46*a* and an outer ring 47 provided with a first outer raceway 47*a*, which first raceways cooperate with the first row of rolling elements 41*a*. The inner ring 46 further comprises a second inner raceway 46*b* and the outer ring 47 further comprises a second outer raceway 47*b*, which second raceways cooperate with the second row of rolling elements 41*b*. The outer raceways 47*a* and 47*b* conform to form a spherical roller bearing geometry arranged to allow for angular misalignment between the inner and outer rings 46 and 47. In other words, the rolling bearing has a common sphered outer raceway in the outer ring 47 and two inner ring raceways 46*a* and 46*b* being inclined at an angle to the bearing axis.

During operation, the rotational movement of the rolling element, such as symmetrical rollers, in relation to the outer ring generates an apparent centrifugal force which, due to the spherical geometry of the outer raceways 47*a* and 47*b*, acts to force the rolling elements axially towards each other along the respective raceways, i.e. into the guide ring 1. Hence, increased operational speed of the rolling bearing results in an increasing force acting to axially move the rolling bearings toward to guide ring, which, in turn, facilitate the function of the guide ring 1 to align the rolling elements along their travelling path in relation to the inner and/or outer ring 46 and 47, e.g. to prevent skew motion of the rolling elements. The centrifugal force is the apparent outward force that draws the rotating rolling elements away from the center axis of the rolling bearing and is caused by the inertia of the body of each of the rolling elements.

For example, during operation, the guide ring 1 allows for controlling of the unloaded rolling elements, i.e. rolling elements which are not in the loaded zone of the rolling bearing. In addition, the guide ring facilitates the controlling of the rolling elements such that they enter the loaded zone of the rolling bearing in an improved and more efficient position. Furthermore, the guide ring allows for less friction during operation which gives more stable temperature running conditions and/or more quiet operation.

By being a floating type guide ring, the guide ring is freely roratably arranged in relation to the inner and/or the outer ring of a rolling bearing. The guide ring may further be free to move in the axial direction in relation to the inner and/or the outer ring of the rolling bearing. However, the axial movement of the guide ring is commonly restricted by the rolling elements arranged in abutment with the guide ring on respective axial sides of the guide ring.

Furthermore, a floating guide ring may be in sliding contact with the inner and/or outer ring of the rolling bearing. The guide ring may also be suspended between the inner and outer rings of a rolling bearing by the rolling elements or by a rolling bearing cage arranged radially inside the floating guide ring.

In FIGS. 6*a-c*, schematic cross-sectional views of exemplifying rolling bearings 40 comprising different designs, different embodiments of the guide ring 1 according to the present invention, and alternative bearing cages 44, 44*a* and 44*b* are shown. For example, the cages may be machined, pressed or shaped by other forming techniques of e.g. steel, brass, plastic or other suitable rolling bearing cage material.

In FIG. 6*a*, the rolling bearing is provided with a double pronged cage 44 for controlling the position of the first and second rows of rolling elements. The cage 44 is arranged radially outside and is supported by the guide ring 1 which acts to ensure the correct radial position of the cage 44 in relation to the inner ring 46, outer ring 47 and/or rolling elements. The guide ring 1 is centered on the inner ring 46.

In FIG. 6*b*, the rolling bearing is provided with two window-type cages 44*a* and 44*b*, a flangeless inner ring 46 and guide ring 1 centred on the inner ring, wherein each axially inner portion of the cages 44*a* and 44*b* rests upon a respective side portion of the guide ring 1.

In FIG. 6*c*, the rolling bearing is provided with two pressed window-type steel cages 44 and flangeless inner ring 4, wherein the guide ring 1 is centred on the cages 44.

In FIG. 7 is a partial schematic perspective view of an exemplifying embodiment of the guide ring 1 according to the present invention for guiding a roller bearing roller 41*a* in a roller bearing. During operation, roller 41*a* travels along the inner raceway 46*a* of inner ring 46 such that the relative movement between the center axis of the roller 41 and the raceway 46*a* correspond to arrow E, and the rotational movement of the roller 46*a* around its rotational axis substantially corresponds to arrow D. Furthermore, internal frictional forces occurring at the roller-raceway interface, which may be caused by the curved profile of the contacting surface of the roller 41 and the raceway 46*a*, may give rise to skewing movement of the roller 46 around skew axis F being substantially normal to the roller-raceway interface. As illustrated, side portion 3*a* of the partial guide ring 1 extends from the base portion 2 such that is arranged next to an axial end portion 43*a* of the roller 46, such that skewing movement of the roller 46 is advantageously prevented during operation when the roller 46 is forced towards the guide ring 1.

According to various embodiments of the invention, the guide ring may be formed in manufacturing processes involving pressure turning, or metal spinning, or flow forming of a sheet metal workpiece, or in a manufacturing process involving roll forming techniques wherein a sheet-formed workpiece is passed through and formed by sets of rollers.

For example, the guide ring 1 or 31 described above may be formed by a flow forming arrangement which for example may form part of an automated manufacturing line including computer numerical controlled (CNC) operation. The flow forming arrangement may e.g. comprise a spindle unit arranged to secure and rotate a sheet metal workpiece being provided with a cylindrical-shape around rotational axis in relation to a motion controlled tool turret and metal shaping tool. For example, during forming, the tool is placed on the rotating cylindrical-shaped workpiece and exerts compressive forces on the workpiece leading to material flow in the metal such that the workpiece is bend into the desired shaped comprising base portion 2 and side portions 3*a* and 3*b*.

The guide ring 1 and 31 may also be formed by a roll forming arrangement which for example may form part of an automated manufacturing line including computer numerical controlled (CNC) operation. The roll forming arrangement may e.g. comprises a first, second and final set of rollers each comprising respective first, second and final contacting surfaces for bending a sheet material workpiece while being transferred through the sets of rollers. For example, the sheet material workpiece may be formed of a cut piece of flat metal, but may also be formed of continuous metal strip arranged on a roll of metal being continuously transferred through forming process of the rollers.

According to an embodiment, the or each roller set may of a roll forming arrangement may comprise two cooperating opposing rollers arranged to receive the workpiece between respective contacting surfaces. Optionally or alternatively, each roller set may comprise a roller and non-rotating support surface, wherein the workpiece is passed between and formed by the contacting surface of the roller and the support surface. The roller set may further be arranged to provide the workpiece with a circular shape, wherein longitudinal end portions of the workpiece are connected, e.g. by welding, to form the guide ring.

It should be noted that the invention has mainly been described above with reference to a few embodiments. However, as is readily appreciated by a person skilled in the art, other embodiments than the ones disclosed above are equally possible within the scope of the invention, as defined by the appended patent claims.

It is further noted that, in the claims, the word "comprising" does not exclude other elements or steps, and the indefinite article "a" or "an" does not exclude a plurality. A single apparatus or other unit may fulfill the functions of several items recited in the claims. The mere fact that certain features or method steps are recited in mutually different dependent claims does not indicate that a combination of these features or steps cannot be used to an advantage.

The invention claimed is:

1. A guide ring for controlling a position of at least one of rolling elements and a bearing cage in relation to an inner ring of a rolling bearing,
   wherein the guide ring has an annular shape with a centered axial opening along a center axis, the guide ring comprising:
   a base portion extending in an axial direction,
   a first side portion extending in a radial direction from a first axial end portion of the base portion, and
   a second side portion extending in a radial direction from a second axial end portion of the base portion, wherein the first side portion and the second side portion are integrally formed with the base portion of a one-piece sheet material, the first side portion having a first radially outer end and the second side portion having a second radially outer end,
   a first cage support extending from the first radially outer end of the first side portion in a direction towards the second side portion and ending at a first cage support axial end,
   a second cage support extends from the second radially outer end of the second side portion in a direction towards the first side portion and ends at a second cage support axial end,
   wherein a radial outer opening exists axially between the first cage support axial end and the second cage support axial end such that the first and second radially outer ends of the first and second side portions are not connected by a solid, continuous segment such that the first and second side portions are joined only by the base portion,
   the first and second side portions of the guide ring are configured to flex axially inwardly upon movement of the rolling elements in relation to the guide ring due to the radial outer opening, thereby providing improved load distribution and uniform running of the rolling elements, and wherein the first and second side portions are resilient such that the first and second side portions are able to return to their original position after flexing axially inwardly.

2. The guide ring according to claim 1,
   the first side portion further comprising an axially outer first control surface for controlling the position of the rolling elements, and
   the second side portion further comprising an axially outer second control surface for controlling the position of the rolling elements.

3. The guide ring according to claim 2, wherein the first side portion has a first curved profile from the first axial end portion of the base portion to the first radially outer end when viewing the guide ring in cross-section, and the second side portion has a second curved profile from the second axial end portion of the base portion to the second radially outer end when viewing the guide ring in cross-section.

4. The guide ring according to claim 1, the guide ring further comprising a wedge-shaped cross-section formed by the first side portion and the second side portion, wherein the wedge-shaped cross-section extends annularly around the center axis.

5. The guide ring according to claim 1, wherein the base portion, the first side portion, and the second side portion extend annularly around the center axis.

6. The guide ring according to claim 1, further comprising a hollow space formed axially between the first side portion and the second side portion,
   wherein the hollow space extends annularly around the center axis.

7. The guide ring according to claim 1, further comprising:
   a first bend formed in the sheet material, wherein the first bend forms the first axial end portion of the base portion, and
   a second bend formed in the sheet material, wherein the second bend forms the second axial end portion of the base portion.

8. The guide ring according to claim 1, combined with the inner ring, the rolling elements, and the bearing cage for controlling the position of the rolling elements forming the rolling bearing,
   wherein a radially outer cage support portion of the guide ring is abutting the bearing cage for supporting and radially positioning the bearing cage in relation to the inner ring.

9. A rolling bearing comprising:
   a guide ring having an annular shape with a centered axial opening along a center axis, the guide ring comprising:
   a base portion extending in an axial direction,
   a first side portion extending in a radial direction from a first axial end portion of the base portion, and
   a second side portion extending in a radial direction from a second axial end portion of the base portion, wherein the first side portion and the second side portion are integrally formed with the base portion of a one-piece sheet material, the first side portion having a first radially outer end and the second side portion having a second radially outer end,
   a first cage support extending from the first radially outer end of the first side portion in a direction towards the second side portion and ending at a first cage support axial end,
   a second cage support extends from the second radially outer end of the second side portion in a direction towards the first side portion and ends at a second cage support axial end, wherein a radial outer opening exists axially between the first cage support axial end and the second cage support axial end such that the first and second radially outer ends of the first and second side portions are not connected by a solid, continuous segment such that the first and second side portions are joined only by the base portion; and a first row of rolling elements and a second row of rolling elements, wherein the first side portion is abutting an axial end portion of at least one rolling element of the first row of rolling elements arranged on a first axial side of the guide ring, wherein the second side portion is abutting an axial end portion of at least one rolling element of the second row of rolling elements arranged on a second axial side of the guide ring, the first and second side portions of the guide ring are configured to flex axially inwardly upon movement of the first row of rolling elements and the second row of rolling elements in relation to the guide ring due to the radial outer opening, thereby providing improved load distribution and uniform running of the at least one of the first row of rolling elements and the second row of rolling elements, and wherein the first and second side portions are resilient such that the first and second side portions are able to return to their original position after flexing axially inwardly.

10. The rolling bearing according to claim 9, wherein the first side portion is arranged to restrict skewing motion of the first row of rolling elements, and the second side portion is arranged to restrict skewing motion of the second row of rolling elements.

11. A method for manufacturing a guide ring for controlling a position of at least one of rolling elements and a bearing cage in relation to an inner ring of a rolling bearing, the method comprising steps of:

providing a workpiece of sheet material to be formed into the guide ring, forming the workpiece by bending action such that the workpiece is provided with an annular shape having a center axis, providing a first side portion by forming the workpiece, and providing a second side portion by forming the workpiece, wherein a base portion of the workpiece is formed between the first and second side portions, the base portion extends in an axial direction, the first side portion extends in a radial direction from a first axial end portion of the base portion, and the second side portion extends in a radial direction from a second axial end portion of the base portion, providing a first cage support extending from a first radially outer end of the first side portion in a direction towards the second side portion and ending at a first cage support axial end, providing a second cage support extending from a second radially outer end of the second side portion in a direction towards the first side portion and ending at a second cage support axial end, wherein a radial outer opening exists axially between the first cage support axial end and the second cage support axial end such that the first and second radially outer ends of the first and second side portions are not connected by a solid, continuous segment such that the first and second side portions are joined only by the base portion, the first and second side portions of the guide ring are configured to flex axially inwardly upon movement of the rolling elements in relation to the guide ring due to the radial outer opening, thereby providing improved load distribution and uniform running of the rolling elements, and wherein the first and second side portions are resilient such that the first and second side portions are able to return to their original position after flexing axially inwardly.

12. The method according to claim 11, wherein the step of providing at least one of the first side portion and the second side portion comprises forming the at least one of the first side portion and the second side portion by flow forming the workpiece.

13. The method according to claim 11, wherein the step of providing at least one of the first side portion and the second side portion comprises forming the at least one of the first side portion and the second side portion by roll forming the workpiece.

* * * * *